Jan. 27, 1959  F. J. RADA ET AL  2,870,902
CONVEYOR BELT STRUCTURE
Filed April 20, 1956  2 Sheets-Sheet 1
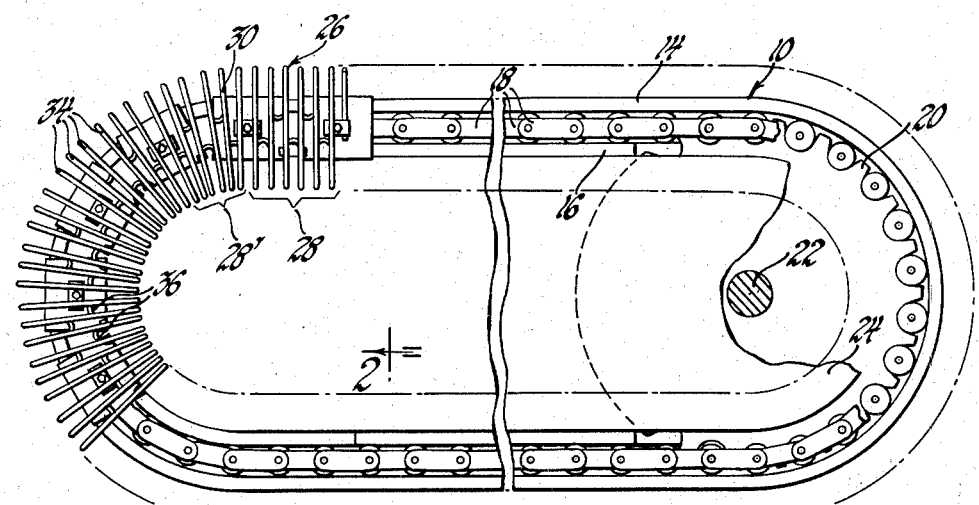
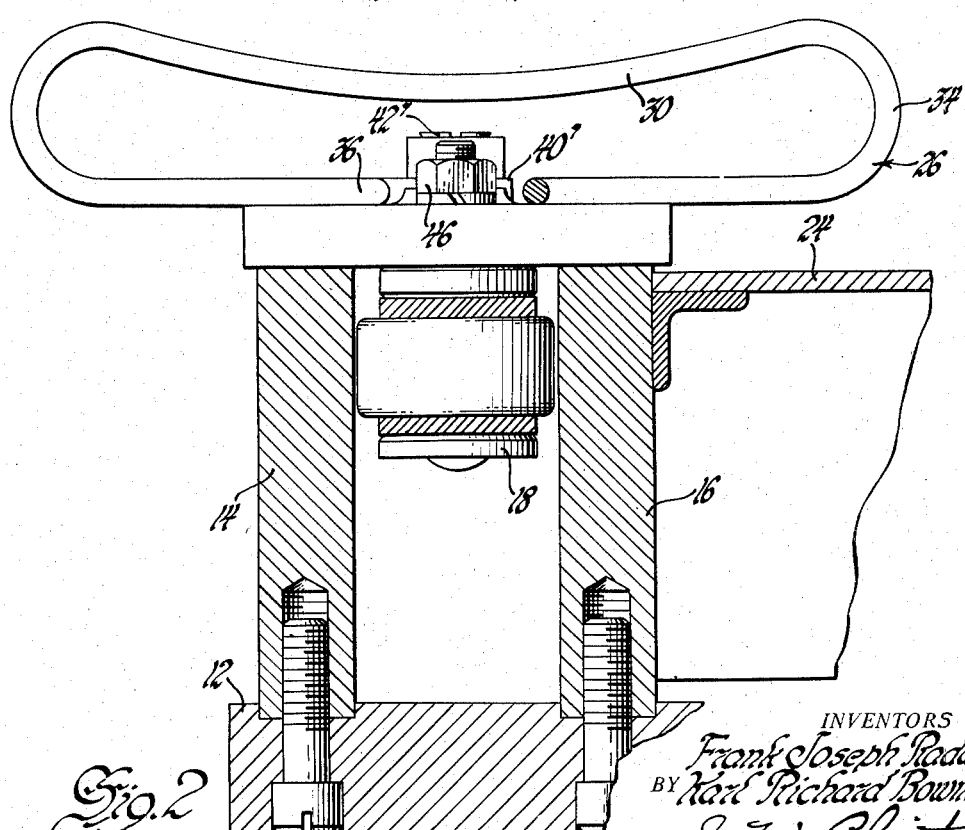
INVENTORS
Frank Joseph Rada &
BY Karl Richard Bowman
E. W. Christen
ATTORNEY Jan. 27, 1959   F. J. RADA ET AL   2,870,902
CONVEYOR BELT STRUCTURE
Filed April 20, 1956   2 Sheets-Sheet 2

INVENTORS
Frank Joseph Rada &
BY Karl Richard Bowman
E. W. Christen
ATTORNEY

United States Patent Office 2,870,902
Patented Jan. 27, 1959

2,870,902
CONVEYER BELT STRUCTURE

Frank Joseph Rada and Karl Richard Bowman, Anderson, Ind., assignors to General Motors Corporation, Detroit, Mich., a corporation of Delaware Application April 20, 1956, Serial No. 579,578

8 Claims. (Cl. 198—181)

This invention relates to conveyer apparatus and more particularly to an improved conveyer belt structure.

In many conveyance operations such as the transfer of parts between machines on a production line, it is desirable to utilize a curvilinear conveyance course. Furthermore, in the production of numerous articles, improved efficiency in handling is obtained from the use of a continuous workpiece receiving surface on the conveyer. Heretofore, these features have not been realized in simple and rugged conveyers. A typical example of a need for such features of operation occurs in the manufacture of all glass sealed beam headlamps in which the lamp is heated to a high tempertaure in the sealing machine and then transferred to the exhaust and basing machines in sequence. The placement of the lamps on the conveyer is greatly facilitated by use of a belt type or continuous surface conveyer since accurate positioning is unnecessary. The course of conveyance, which may be dictated by the arrangement of machines, the rate of work flow, the amount of cooling required, and other considerations, is desirably of racetrack configuration. Also, the conveyer preferably should permit rapid heat dissipation from the workpiece.

Accordingly, it is an object of this invention to provide a conveyer belt permitting transverse flexure in the plane of the belt.

Another object is to provide a conveyer having a continuous workpiece receiving surface adapted for a curvilinear conveyance course.

An additional object of the invention is to provide a conveyer belt adapted for transverse flexure in the plane of the belt and having a workpiece receiving surface of channel shape.

A further object is to provide an endless conveyer of rugged, inexpensive construction especially adapted for permitting heat dissipation from the conveyed parts.

In accordance with this invention, the conveyer belt comprises a workpiece support member formed of multiple spaced apart elements extending transversely of the conveyance course, the opposite ends of each element being connected to alternate adjacent elements by a resilient coupling. Plural mounting members secured to the elements are spaced along the course and adapted for connection with driving means for moving the belt.

A more complete understanding of the invention may be had from the detailed description which follows, taken with the accompanying drawings in which:

Figure 1 is a plan view of the inventive conveyer apparatus.

Figure 2 is a sectional view taken on lines 2—2 of Figure 1.

Figure 3:
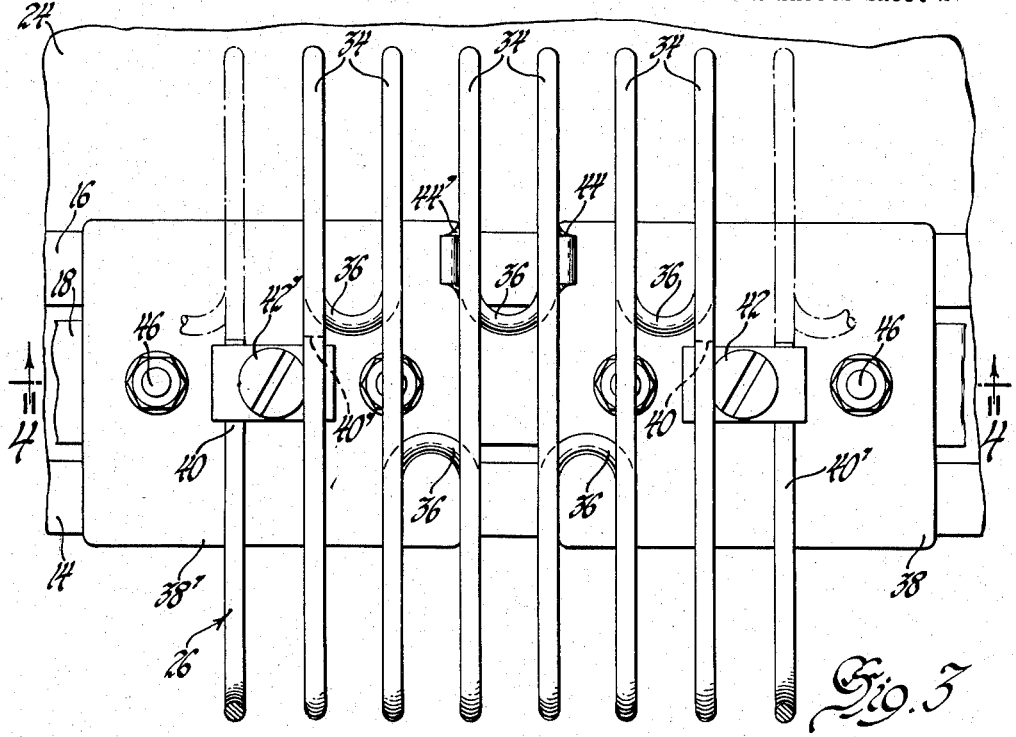
Figure 3 is a plan view of the conveyer belt showing details of construction.

Referring now to the drawings there is shown an illustrative embodiment of the invention in a horizontal continuous conveyer. The conveyer comprises a table, designated generally at 10, which includes a horizontal support plate 12. A pair of parallel inner and outer guide tracks 14 and 16 are mounted upon the plate 12 and define a conveyance course of racetrack configuration. Disposed between the guide tracks is an endless drive chain 18, suitably of the roller type. A drive sprocket 20 mounted on shaft 22 is rotatably driven by a suitable motor (not shown) and meshes with the drive chain for imparting movement thereto in the guide tracks. A cover plate 24 is disposed over the drive sprocket 20 and closes the space within the inner guide track 16. A conveyer belt, designated generally at 26, is driven along the conveyance course by the drive chain 18.

As shown in Figures 1 and 2, the conveyer belt 26 comprises plural sections 28, 28', etc. which are disposed in alignment along the course of the tracks 14 and 16. The belt is arranged in endless connection and provides a continuously extending workpiece receiving surface 30 which is of channel shape in cross section.

Figure 4:
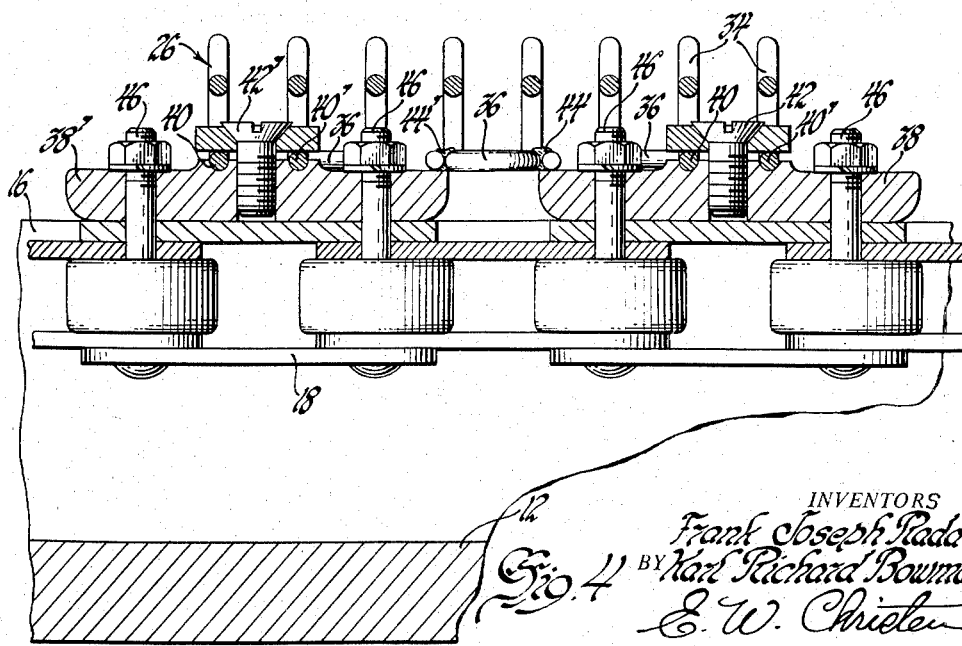
Figure 4 is a sectional view taken on lines 4—4 of Figure 3.

Each section of the belt 26, as shown in Figures 3 and 4, comprises multiple parallel elements or wire rails 34 extending transversely of the conveyance course. Each element or rail 34 is connected at each end to the corresponding end of a different adjacent element by a bight portion or spring arch 36 providing a resilient coupling. Each belt section is preferably formed of a continuous spring wire disposed in sinuous configuration to form the rails 34 and arches 36. It is noted that the arches 36 are bent inwardly in spaced relation below the rails 34 in re-entrant fashion.

The belt 26 also includes plural mounting plates 38, 38', etc. to which the belt sections are secured. The mounting plates are disposed in alignment along the tracks 14 and 16 with sufficient clearance to avoid interference between adjacent plates in the curved portion of the conveyance course. One end 40 of each belt section is secured to the adjacent mounting plate 38 by a centrally located clamping bracket and screw threaded fastener 42. Similarly, the other end 40' of each belt section is secured to the adjacent plate 38' by a clamping bracket and fastener 42'. Additionally, the intermediate spring arch 36 on the inner edge of the belt is secured to the adjacent plate 38 by a weldment 44 and to the adjacent plate 38' by a weldment 44'. The mounting plates are suitably secured to the drive chain 18 by the link bolts 46 for imparting movement to the belt along the tracks 14 and 16.

In operation of the conveyer, workpieces of any configuration may be readily loaded on the channel shaped receiving surface 30 without being accurately located. The spaced arrangement of the rails 34, which form the workpiece receiving surface, enhances the cooling of heated workpieces during conveyance. Throughout the conveyance course the planar configuration of the workpiece receiving surface is maintained due to the flexibility in the plane of the belt. When a belt section, such as 28, is moving along a straight line position of the course, the rails 34 remain parallel. When a belt section, such as 28', encounters a curved portion of the course, the rails of the section are permitted to form a fan shaped array by the flexure of the spring arches 36. The angularity of the adjacent mounting plates which support the belt section causes the spring arches on the inner edge of the belt to be compressed and the arches on the outer edge of the belt to be spread apart. The flexure throughout each section is caused to be uniform by securing the ends and selected intermediate arches of each belt section to the adjacent mounting plates.

Although the description of this invention has been given with respect to a particular embodiment of the invention, it is not to be construed in a limiting sense. Many variations and modifications within the spirit and scope of the invention will now occur to those skilled in the art. For a definition of the invention, reference is made to the appended claims.

What is claimed is:

1. A conveyer comprising a conveyer belt and guide means for the belt defining a conveyance course which changes direction laterally of the belt, plural mounting members supported on the guide means in spaced relation along the course, said belt being formed of multiple, spaced apart elements extending laterally of the course and terminating in opposite ends, said opposite ends of each element being connected to alternate adjacent elements by a resilient coupling permitting lateral flexure of the belt, the belt being secured to each of said mounting members, and driving means for moving said mounting members along said course.

2. A conveyer comprising a conveyer belt and guide means for the belt defining an endless conveyance course which changes direction laterally of the belt, said belt being formed of multiple, spaced apart rod-like elements extending laterally of the course, opposite ends of each element being connected to alternate adjacent elements by spring arches permitting lateral flexure of the belt in traversing the course, plural mounting members secured to said elements and supported on the guide means in spaced relation along the course, and driving means for moving said belt along said course.

3. A conveyer comprising a conveyer belt and guide means for the belt defining an endless conveyance course which changes direction laterally of the belt, said belt comprising a continuous wire formed with multiple parallel elements lying in a common plane and extending laterally of the course for receiving a workpiece and arch portions interconnecting alternate ends of adjacent elements, said arch portions being displaced from the plane of the parallel elements, plural mounting members secured to the arch portions and supported on the guide means in spaced relation along the course, and driving means connected with said mounting members for moving said belt along the course.

4. A conveyer belt adapted to follow a conveyance course which changes direction in the plane of the belt, said belt comprising a wire of sinuous configuration extending longitudinally of the belt and forming a substantially planar workpiece receiving surface, and plural spaced mounting members secured to said wire.

5. A conveyer belt adapted to follow a conveyance course which changes direction in the plane of the belt, said belt comprising a wire of sinuous configuration extending longitudinally of the belt and forming a substantially planar workpiece receiving surface, the bight portions of the wire being displaced transversely from the plane of said surface, and plural spaced mounting members secured to selected bight portions.

6. A conveyor belt adapted for endless connection and transverse flexure in the plane of the belt comprising a wire of sinuous configuration extending longitudinally of the belt and forming channel-shaped workpiece receiving surface, said wire having re-entrant bight portions spaced from the workpiece receiving surface, and plural spaced mounting members secured to selected bight portions.

7. A conveyer belt adapted for endless connection and transverse flexure in the plane of the belt comprising plural sections of sinuously disposed spring wire extending longitudinally of the belt and forming a workpiece receiving surface, each section having re-entrant bight portions spaced from the workpiece receiving surface, plural mounting members in spaced relation adjacent said sections, and opposite ends of each section secured to adjacent mounting members.

8. A conveyer belt adapted for endless connection and transverse flexure in the plane of the belt comprising plural sections of sinuously disposed spring wire extending longitudinally of the belt and forming a workpiece receiving surface, each section having re-entrant bight portions spaced from the workpiece receiving surface, a mounting member disposed adjacent each junction of adjacent sections, the ends of each section being secured to the adjacent mounting member, and selected bight portions being secured to the adjacent mounting member.

References Cited in the file of this patent

UNITED STATES PATENTS

| 1,004,687 | Hunt | Oct. 3, 1911 |
| 1,868,514 | Anstiss | July 26, 1932 |
| 2,646,161 | Lorig | July 21, 1953 |

FOREIGN PATENTS

| 389,500 | Germany | Feb. 2, 1924 |

UNITED STATES PATENT OFFICE

CERTIFICATE OF CORRECTION

Patent No. 2,870,902 January 27, 1959

Frank Joseph Rada et al.

It is hereby certified that error appears in the printed specification of the above numbered patent requiring correction and that the said Letters Patent should read as corrected below.

Column 2, line 58, for "position" read -- portion --.

Signed and sealed this 21st day of July 1959.

(SEAL)
Attest:

KARL H. AXLINE

Attesting Officer

ROBERT C. WATSON
Commissioner of Patents